Figure 3:
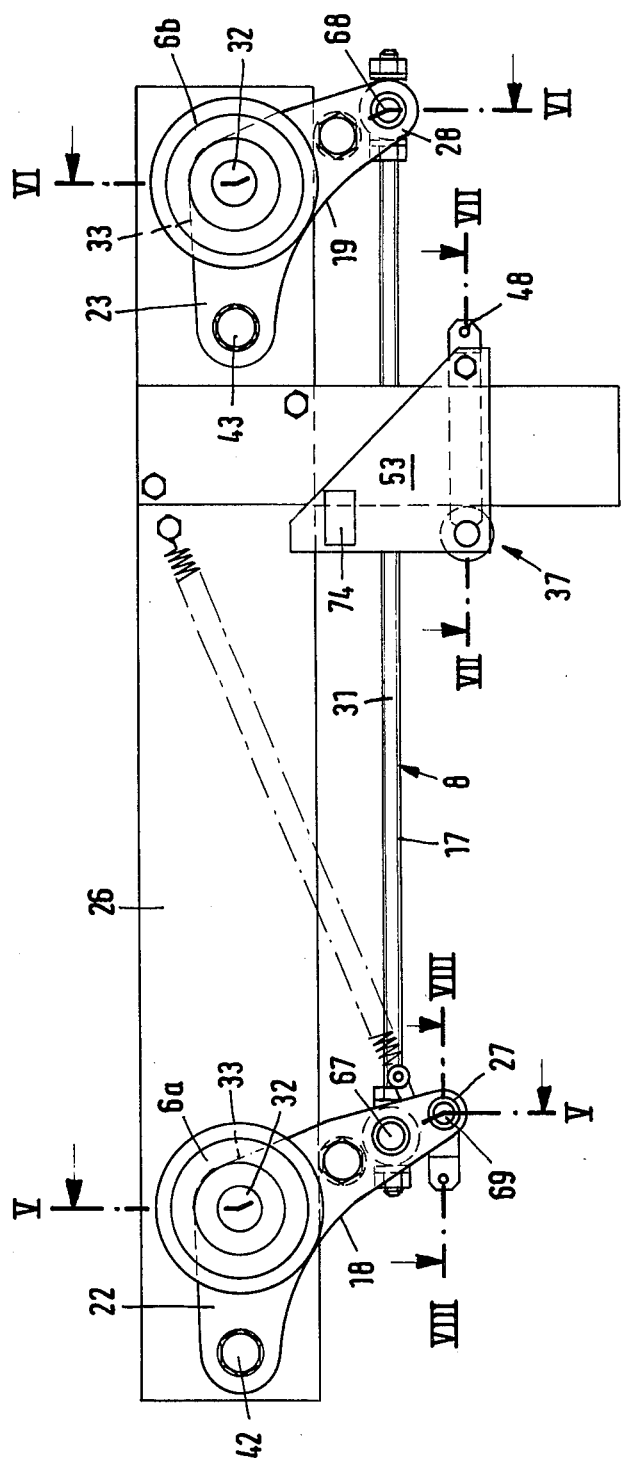

United States Patent [19]

Regenbrecht

[11] 4,440,292
[45] Apr. 3, 1984

[54] APPARATUS FOR TRANSVERSE MOVEMENT OF ELONGATED WORKPIECES

[75] Inventor: Ludwig Regenbrecht, Gevelsberg, Fed. Rep. of Germany

[73] Assignee: Rolf Peddinghaus, Ennepetal, Fed. Rep. of Germany

[21] Appl. No.: 299,790

[22] Filed: Sep. 4, 1981

[51] Int. Cl.³ .............................................. B65G 25/00
[52] U.S. Cl. .................................................. 198/774
[58] Field of Search ............... 198/740, 774, 776, 488, 198/614

[56] References Cited

U.S. PATENT DOCUMENTS 3,581,880  6/1971  Iversen ................................. 198/774
3,970,191  7/1976  Oldfield et al. ...................... 198/740

Primary Examiner—Joseph E. Valenza
Assistant Examiner—Dennis J. Williamson
Attorney, Agent, or Firm—Dressler, Goldsmith, Shore, Sutker & Milnamow, Ltd.

[57] ABSTRACT

The invention relates to an apparatus for the essentially horizontal transport of elongate workpieces transversely to their longitudinal direction, consisting of a supporting framework with vertical legs and with horizontal guide beams which are supported by the legs and which are arranged, at a distance, parallel to the transport direction of the workpieces, of lifting carriages, the track wheels of which are movable in lateral longitudinal channels of the guide beams, but are secured against vertical movements, of a lifting device for lifting the lifting carriage over the top side of the guide beams and for lowering the lifting carriages under the top side of the guide beams, and of a flexible pulling member, of which the ends provided in the upper section of the pulling member are each connected to a lifting carriage and which is guided underneath each guide beam around a direction-changing wheel and a drive wheel in a vertical plane, the direction-changing wheel being mounted with its horizontal pivot axle in the region of one end of the guide beams, while the drive wheel is mounted with its horizontal pivot axle in the region of the other end of the guide beams.

3 Claims, 8 Drawing Figures

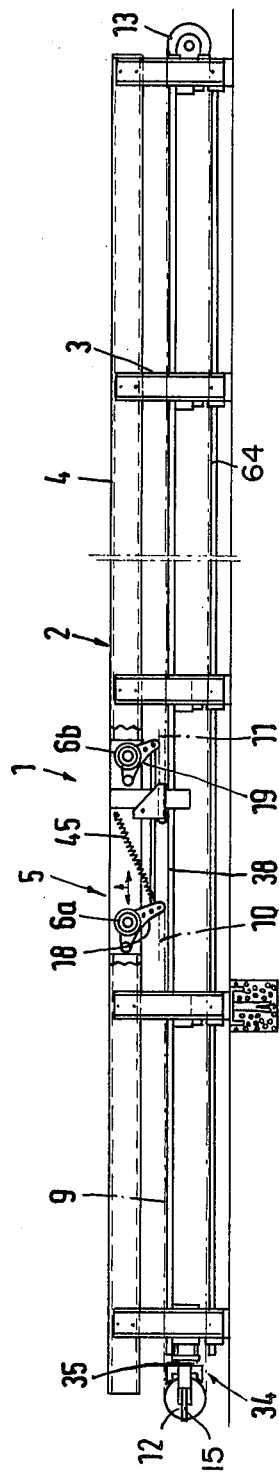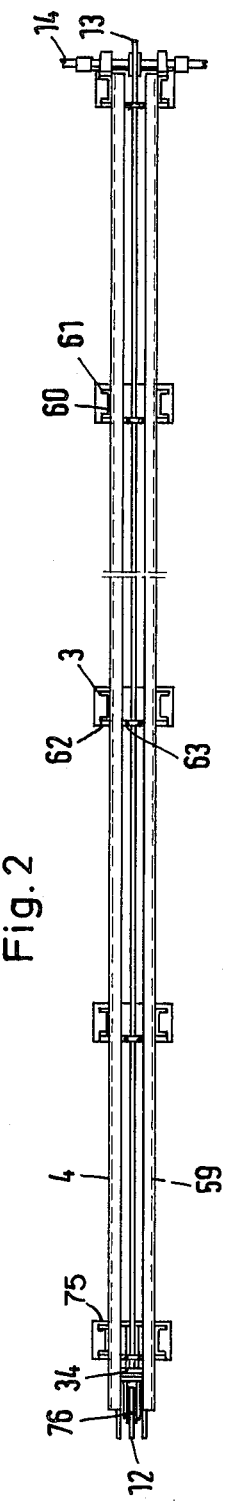

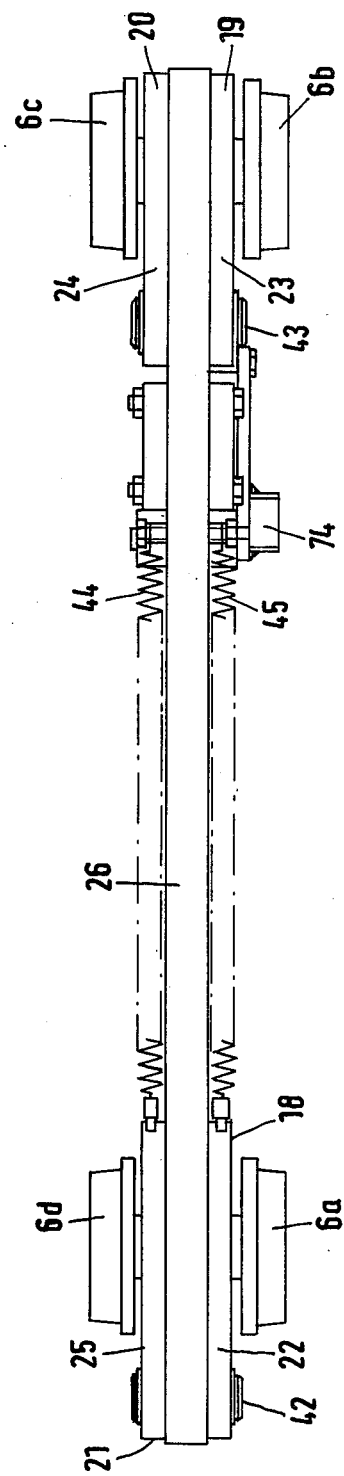
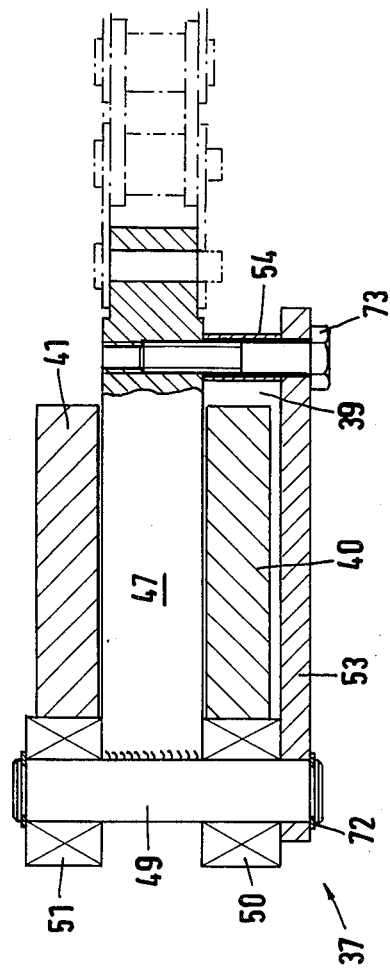
Fig. 4
Fig. 7 (VII-VII)

APPARATUS FOR TRANSVERSE MOVEMENT OF ELONGATED WORKPIECES

The invention relates to an apparatus for the essentially horizontal transport of elongate workpieces transversely to their longitudinal direction, consisting of a supporting framework with vertical legs and with horizontal guide beams which are supported by the legs and which are arranged, at a distance, parallel to the transport direction of the workpieces, of lifting carriages, the track wheels of which are movable in lateral longitudinal channels of the guide beams, but are secured against vertical movements, of a lifting device for lifting the lifting carriage over the top side of the guide beams and for lowering the lifting carriages under the top side of the guide beams, and of a flexible pulling member, of which the ends provided in the upper section of the pulling member are each connected to a lifting carriage and which is guided underneath each guide beam around a direction-changing wheel and a drive wheel in a vertical plane, the direction-changing wheel being mounted with its horizontal pivot axle in the region of one end of the guide beams, whilst the drive wheel is mounted with its horizontal pivot axle in the region of the other end of the guide beams.

An apparatus of the type mentioned above is known from U.S. Pat. No. 3,917,078. In the apparatus according to this patent specification, which is herewith incorporated by reference, lifting carriages drivable by means of a motor are attached to a horizontal guide system which can be lifted on a vertical guide system. Used as lifting devices are hydraulic cylinders in legs, the horizontal guide system being supported by the ends of these legs. Depending on the loading of the horizontal guide system by workpieces, for example double-T girders, located thereon, it is possible for the lifting movement caused by the two hydraulic cylinders engaging on the ends of a horizontal guide system to take place unevenly. To prevent the parts movable relative to one another from jamming as a result of this, special constructional measures are provided in the known apparatus which is, consequently, very complicated and costly in its overall design and can give rise to an uneven delayed lifting of the workpieces by the lifting system.

Apparatuses of the known type mentioned in the introduction, also designated as cross-conveyors, are, as a rule, an integral part of conveying systems which serve to feed workpieces from a supply by means of a cross-conveyor to a longitudinal conveyor, for example a roller conveyor, which feeds the workpiece in a longitudinal direction to a processing device, for example a saw, a stamping machine or a drill, for the purpose of machining. Following the machining, the machined workpiece is transported by means of the longitudinal conveyor, on the discharge side of the processing device, into the range of action of a further cross-conveyor, the lifting carriages of which lift the workpiece from the longitudinal conveyor and which feeds this to its next destination, for example for further processing or to a store. An apparatus of this type is described completely in U.S. Pat. No. 3,917,078 mentioned, so that it is possible to do without an illustration and description of the processing device and the longitudinal conveyor in the present application. This is because the present invention relates exclusively to an improvement of the apparatus transporting the workpieces transversely to their longitudinal direction, hence of the cross-conveyor, one cross-conveyor being assigned, in each case, in a processing installation, to the longitudinal conveyor in front of and behind the processing device, for feeding and removing the workpieces.

The object on which the invention is based is to improve the known apparatus mentioned in the introduction, so that it guarantees a reliable lifting and lowering of the workpieces with as small an outlay in terms of construction as possible, while permitting corresponding economical manufacture, and ensuring that the workpieces are lifted from their guide beams and lowered exclusively in a vertical direction and, consequently, can be lowered exactly at the point which is required for the workpieces.

The invention achieves this object in that the lifting device for each lifting carriage consists of a parallel crank gear with sides of equal size in pairs, the web of which is formed by a lifting plate of the lifting carriage, the short sides of which are formed by angle levers having lifting arms articulated to the lifting plate, and the connecting rod of which is formed by a longitudinally adjustable rod connected pivotally to the ends of the pulling arms of the angle levers, that the axle of each track wheel is attached in the region of the angling of the associated angle lever and forms the pivot axis of the angle lever, that the one flexible end of the pulling member leading to the direction-changing wheel is connected to the pulling arm of the angle levers, that the other end of the flexible pulling member leading to the drive wheel is connected to the lifting carriage relatively immovably in its direction of movement, that a setting device is located in the supporting framework, and its setting member being movable horizontally and supporting the horizontal pivot axle of the direction-changing wheel for the pulling member, so that, when the drive wheel is stationary, a pulling effect can be exerted, by actuating the setting device, on the end of the pulling member leading to the direction-changing wheel, and by means of this pulling effect the angle levers are pivoted about the axle of their track wheels and, during this time, the lifting plate is lifted over the top side of the guide beams by the lifting arms, articulated to the lifting plate, of the angle levers, whilst the lifting plate is retained immovably in the longitudinal direction of the guide beams by the other end of the pulling member.

The other end of the flexible member leading to the drive wheel is appropriately fastened to a pulling-member holder which is guided movably on the horizontal guide for the upper section of the flexible pulling member and which has a vertical aperture, at least one side plate being fastened to the lifting plate of the lifting carriage and projecting relatively movably from this lifting plate downwards into the aperture of the pulling-member holder.

Further features of the invention are described below with reference to the description of an exemplary embodiment of the invention which is illustrated in the drawing and which serves merely to explain the invention, the scope of protection of which is outlined by the present description and the patent claims.

Figure 5:
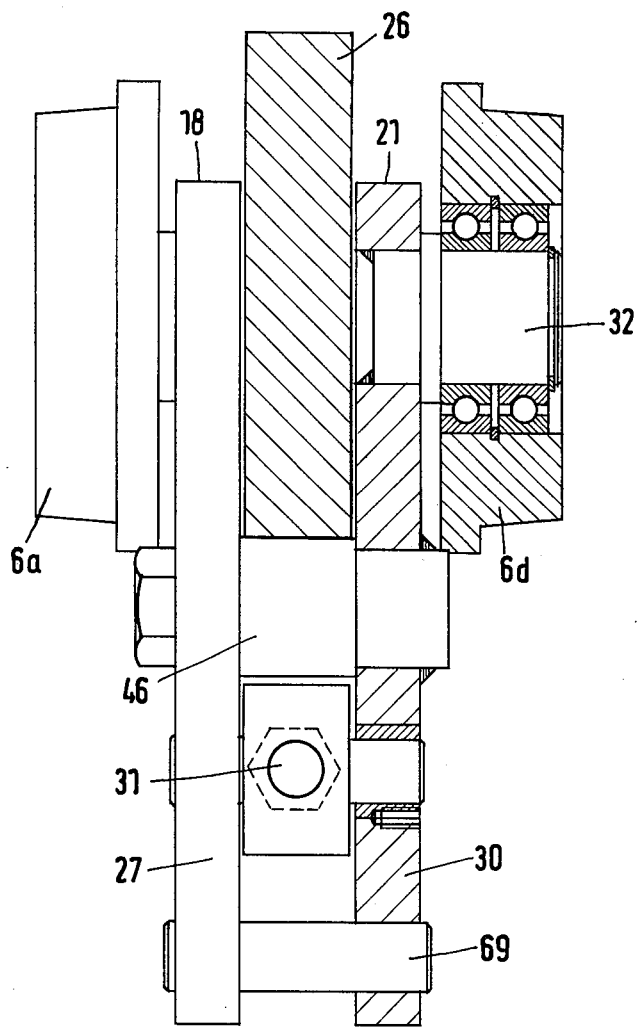
Figure 8:
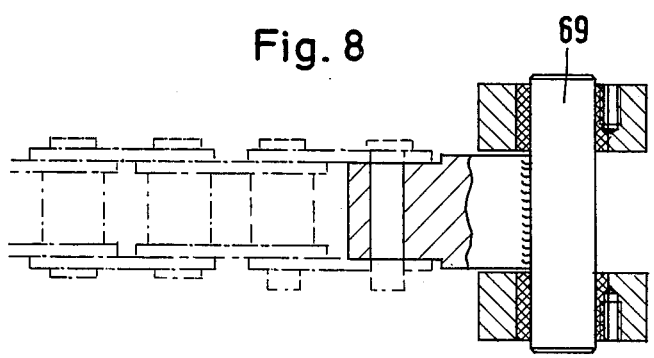
Figure 6:
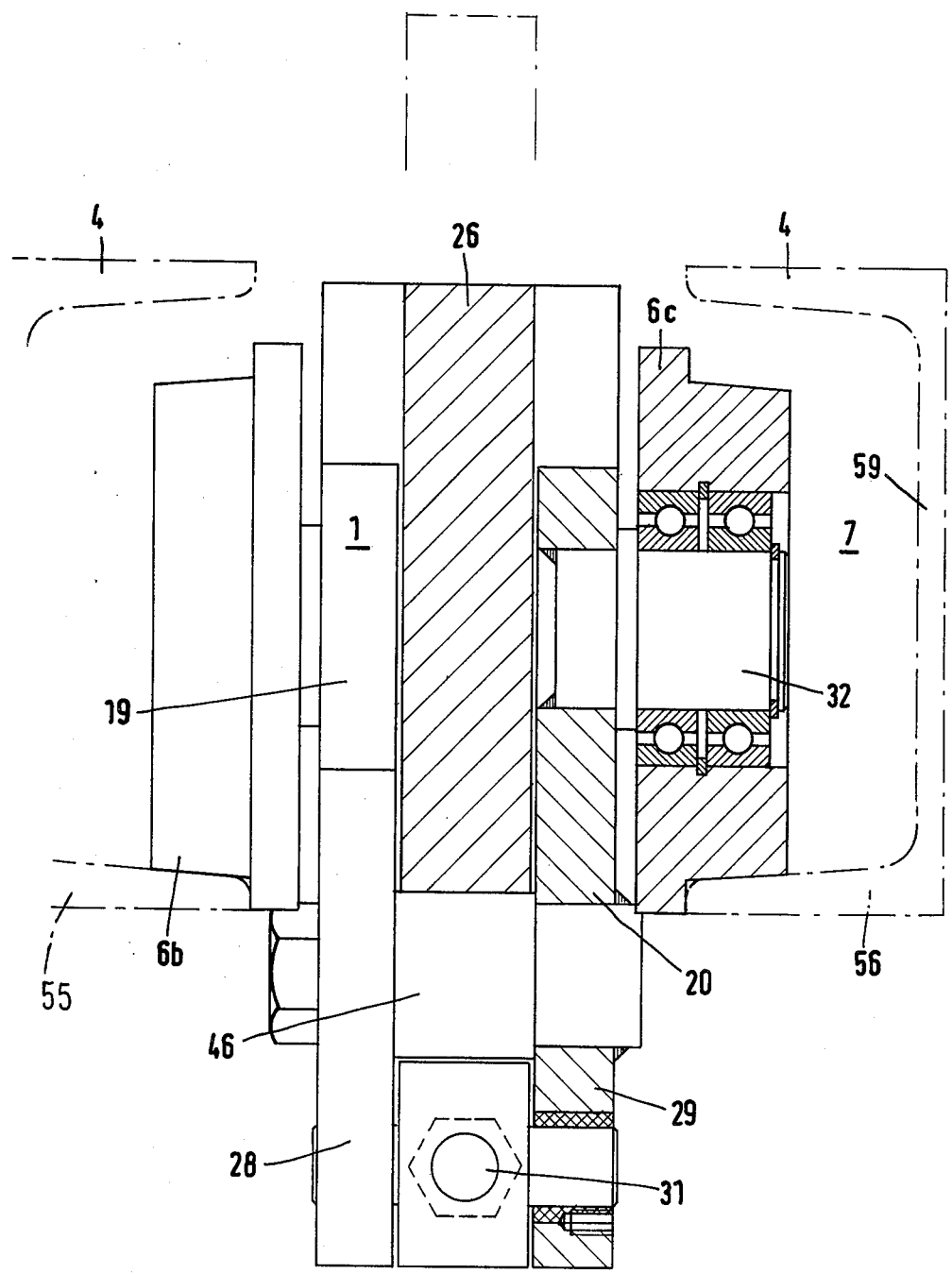

FIG. 1 shows the apparatus according to the invention in a partially cutaway view, FIG. 2 shows a plan view relating to FIG. 1, FIG. 3 shows a view of the lifting carriage on a larger scale, FIG. 4 shows a plan view of the lifting carriage according to FIG. 3, FIG. 5 shows a section along the line V—V in FIG. 3, FIG. 6 shows a section along the line VI—VI in FIG. 3, FIG. 7 shows a section along the line VII—VII in FIG. 3, and FIG. 8 shows a section along the line VIII—VIII in FIG. 3.

The drawings show an apparatus 1 for the essentially horizontal transport of elongate workpieces, for example profile bars, double-T girders, etc., transversely to their longitudinal direction, this apparatus consisting of a supporting framework 2 with vertical legs 3 and with horizontal guide beams 4 supported by the legs 3. The guide beams 4 are arranged, at a distance, parallel to the transport direction of the workpieces. Lifting carriages 5 are provided, the track wheels 6a, 6b, 6c, 6d of which are movable in lateral longitudinal channels 7 of the guide beams 4, but are secured against vertical movements. Also provided is a lifting device 8 for lifting the lifting carriage 5 over the top side of the guide beams 4 and for lowering the lifting carriages 5 under the top side of the guide beams 4. A flexible pulling member 9 is connected, by means of its ends 10, 11 provided in its upper section, in each case to the lifting carriage 5 and is guided underneath each guide beam 4 around a direction-changing wheel 12 and a drive wheel 13 in a vertical plane. The drive wheel 13 sits on a drive shaft 14 which can be coupled, in a way known per se and therefore not shown, to a brakable drive motor.

U.S. Pat. No. 3,917,978 shows completely a cross-conveyor with several horizontal guide beams of the cross-conveyor, which are located at a distance from one another, so that the invention is illustrated and described only with reference to one guide beam having lifting carriages located thereon.

The direction-changing wheel 12 is mounted with its horizontal pivot axle 15 in the region of one end of the guide beams 4, whilst the drive wheel 13 is mounted, with its horizontal axle formed by the drive shaft 14, in the region of the other end of the guide beams 4.

According to the invention, the lifting device 8 for each lifting carriage 5 consists of a parallel crank gear 17 which consists of sides of equal size in pairs and the web of which is formed by a lifting plate 26 of the lifting carriage 5, the short sides of which are formed by angle levers 18, 19, 20, 21 having lifting arms 22, 23, 24, 25 articulated to the lifting plate 26, and the connecting rod of which is formed by a longitudinally adjustable rod 31 connected pivotally to the ends of the pulling arms 27, 28, 29, 30 of the angle levers 18, 19, 20, 21.

The axle 32 of the track wheels 6a, 6b, 6c, 6d is attached in the region of the angling 33 of the associated angle lever 18, 19, 20, 21 and forms the pivot axis of the respective angle lever.

The angle levers 18, 21 and 19, 20 respectively are made identical in pairs and are attached pivotally by means of their lifting arms 22, 25 and 23, 24 respectively, in pairs, via lifting axles 42 and 43 respectively, each to one of the two ends of the lifting plate 26. In this situation, the lifting arms of the two pairs of angle levers extend from their associated lifting axles 42, 43 approximately horizontally in the direction of the end of the apparatus provided with the drive wheel 13, whilst the pulling arms of the angle levers form an obtuse angle with the associated lifting arms and are directed downwards in pairs parallel to one another.

The pairs of track wheels 6a, 6d and 6b, 6c respectively are each attached, in the region of the angling 33 of the associated angle levers, to their outer side, the axles of said pairs of track wheels being aligned with one another and each being located at the same distance from the lifting axles 42 and 43 respectively and hinge points 67, 68 of the associated pairs of pulling arms 27, 30 and 28, 29 respectively for the longitudinally adjustable rod 17.

The end 10 of the flexible pulling member 9 leading to the direction-changing wheel is articulated at a hinge point 69 to the two pulling arms 27, 30 of the angle levers 18, 21. The other end 11 of the flexible pulling member 9 leading to the drive wheel 13 is articulated at 48 to a pulling-member holder 37 which is guided movably on a horizontal guide 38 for the upper section of the pulling member 9. The end of the pulling-member holder facing away from the end 11 of the flexible pulling member is welded to a transverse axle 49, of which the two ends projecting beyond the parallel longitudinal sides of the pulling-member holder each carry a supporting roller 50, 51. A locking plate 53 is attached, outside a supporting roller, to one axle end by means of a spring ring 72 and is screwed with its other end, by means of a countersunk screw 73 and a spacer sleeve 54, to the bar-shaped part 47 of the pulling-member holder. Consequently, an aperture 39 is formed between the bar-shaped part 47, the plate 53, the spacer sleeve 54 and the supporting roller 50 adjacent to the plate, and a side plate 40 fastened to one outer side of the lifting plate 26 engages into this aperture so as to be movable vertically relative to the pulling-member holder. A side plate 41 corresponding to the side plate 40 is attached to the other vertical outer side of the lifting plate 26, aligned in a transverse direction, at such a distance from the side plate 40 that the two side plates 40, 41 can engage, with play, over the bar-shaped part 47 of the pulling-member holder 37 and come to rest against the two supporting rollers 50, 51.

The locking plate 53 is, as shown in FIG. 3, designed as a right-angled triangle in a general view of it, the supporting rollers 50, 51 being located in its right-angled corner and the hypotenuse extending obliquely upwards from the countersunk screw 73 to the point of intersection with the vertical cathetus side of the locking plate. Welded on in the upper corner is an outwardly projecting stop 74 which, as is evident from FIGS. 3 and 4, is located underneath the path of movement of the track wheels 6a, 6b and, as is evident from FIG. 6, can come to rest against the underside of a U-shaped profile 55. The U-shaped profile forms, with a U-shaped profile 56 located at a distance opposite and parallel, a guide beam 4 for the lifting carriage 5, the open longitudinal channels 7 of these U-shaped profiles lying opposite one another and the inner faces of the lower legs of the U-shaped profiles 55, 56 serving as a running face for the track wheels 6a, 6b, 6c, 6d. In this way, the vertical upward movement of the pulling-member holder 37 is limited towards the top by the stop 74.

The end of the supporting framework 2 assigned to the direction-changing wheel 12 is provided with a setting device 34 consisting of a horizontally arranged lifting cylinder which is fastened in the middle between the U-shaped profiles 55, 56, underneath the horizontal guide 38 for the upper section of the pulling member 9, to a crosspiece 75 extending horizontally between two vertical legs 3 consisting of the U-shaped profiles.

The setting member 35 consisting of the piston rod of the lifting cylinder is composed, at the outer end, of a fork 76 supporting the axle 15 for the direction-changing wheel 12.

If the drive shaft 14 for the drive wheel 13 is held firmly and the setting mebmer 35 is extended out of the setting device 34, so that the end 10 of the pulling member 9 is pulled in the directon of the direction-changing wheel 12, the pair of angle levers 18, 21 undergoes a pivoting movement in a clockwise direction about the axle of the track wheels 6a, 6d. Since the pair of angle levers 19, 20 is connected to the pair of angle levers 18, 21 by the rod 17 which is arranged parallel to the lifting plate 26 and the hinge points 67, 68 of which have the same distance from one another as the lifting axles 42, 43, the pair of angle levers 19, 20 also execute the same pivoting angle as the first-mentioned pair of angle levers in a clockwise direction about the axle of the track wheels 6b, 6c. As a result of this pivoting movement of the pairs of angle levers in a clockwise direction, the lifting plate 26 is lifted by the lifting arms 22, 25 and 23, 24 respectively of the angle levers between the two U-shaped profiles 55, 56 of the guide beam 4 over their top side. This lifting movement of the lifting plate 26 is exactly vertical, because the side plates 40, 41 are supported, with their end edges facing the direction-changing wheel 12, on the supporting rollers 50, 51 and the pivot axis of the pairs of angle levers, which is formed by the track-wheel axles, can compensate its deflection during the movement of the lifting plate by means of a horizontal movement in the U-shaped profiles 55, 56.

When the setting member 35 is retracted into the setting device 34, tension springs 44, 45 provided on both sides of the lifting plate ensure that the necessary tensile stress is exerted on the end of the pulling member 9, so that the latter remains tensioned and, simultaneously, the angle levers are pivoted against the clockwise direction under the action of the tension springs, so that the lifting plate 26 is lowered again under the top side of the guide beam 4 into its original position shown in FIG. 1.

Between the pairs of pulling arms 27, 30 and 28, 29 respectively a stop 46 is located between the hinge point 67 and 68 respectively and the pivot axle of the track wheels, at the same point in each case, and, in the position of rest of the lifting plate 26 or of the pairs of angle levers, which is shown in FIGS. 1 and 3, this stop rests against the underside of the lifting plate 26 and consequently limits the pivoting movement of the pairs of angle levers against the clockwise direction.

FIG. 1 shows that the lower section of the pulling member 9 is also guided in a horizontal guide 64. Both the guide 38 and the guide 64 each consist of a smooth guide strip, and guide bolts 63 on crosspieces 62 located in the region of the legs 3 assume the lateral guidance of the pulling member 9 which can consist, according to FIG. 7, of a plate-link chain.

Finally, it should be noted that the webs 59 of the U-shaped profiles 55, 56 forming the guide beams 4 are connected releasably, for example by screws, to webs 60 of U-shaped profiles 61 which are located at a distance from one another and which are anchored in the ground in a suitable way and form the legs 3.

I claim:

1. Apparatus for horizontal transport of elongate workpieces transverse to their longitudinal direction consisting of frame support means including horizontal guide beams defining longitudinal channels, lifting carriages supported by wheels movable in said channels, single means for moving said carriage relative to said beams in both horizontal and vertical directions whereby the carriage can be raised above the beam to lift the workpiece of the beam and lower the workpiece into the beam when desired, the means for raising each carriage consisting of longitudinally disposed interconnected angle levers and the means for moving the carriages in a longitudinal direction consists of a flexible pulling member disposed over a pulling system including a driving and driven pulley, said angle levers are interconnected by rigid means, said angle levers are pivotally connected to the carriages to adjustably support said carriages, said angle levers are supported by said wheels which move in said channels, means connecting one end of said pulling member to said angle levers and the other end of said pulling member to said carriage.

2. Apparatus as set forth in claim 1 including tension spring means interconnecting a carriage and one of said angle levers whereby the carriage is normally biased into its lowered position when the pulling member is not activated.

3. Apparatus as set forth in claim 1 in which each guide beam consists of two U-shaped profiles which are arranged in a horizontal plane at a distance from and parallel to one another and which are located opposite one another with their open longitudinal channels in each of which are guided two of the track wheels of the lifting carriage which are fastened to the two sides of the lifting plate, which channels are connected to the frame support means.

* * * * *